United States Patent
Valcan

(10) Patent No.: US 12,071,934 B2
(45) Date of Patent: Aug. 27, 2024

(54) METHOD FOR DETERMINING PERFORMANCE PARAMETERS IN REAL TIME

(71) Applicant: VESTAS WIND SYSTEMS A/S, Aarhus (DK)

(72) Inventor: Dumitru-Mihai Valcan, Langå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 249 days.

(21) Appl. No.: 17/441,127

(22) PCT Filed: Mar. 10, 2020

(86) PCT No.: PCT/DK2020/050060
§ 371 (c)(1),
(2) Date: Sep. 20, 2021

(87) PCT Pub. No.: WO2020/187375
PCT Pub. Date: Sep. 24, 2020

(65) Prior Publication Data
US 2022/0163013 A1 May 26, 2022

(30) Foreign Application Priority Data
Mar. 19, 2019 (DK) .......................... PA 2019 70170

(51) Int. Cl.
*F03D 7/04* (2006.01)
(52) U.S. Cl.
CPC ............. *F03D 7/048* (2013.01); *F03D 7/042* (2013.01); *F05B 2220/30* (2013.01)
(58) Field of Classification Search
USPC ........................................................ 702/60
See application file for complete search history.

(56) References Cited

U.S. PATENT DOCUMENTS

| 9,286,646 B1 | 3/2016 | Hoff |
| 2004/0230377 A1 | 11/2004 | Ghosh et al. |

(Continued)

FOREIGN PATENT DOCUMENTS

| CN | 103825295 A | 5/2014 |
| CN | 108475929 A | 8/2018 |

(Continued)

OTHER PUBLICATIONS

Danish Patent and Trademark Office, 1st Technical Examination for Patent Application PA 2019 70170 dated Sep. 27, 2019.

(Continued)

*Primary Examiner* — Wesley G Harris
(74) *Attorney, Agent, or Firm* — Patterson + Sheridan, LLP

(57) ABSTRACT

Embodiments herein determine performance parameters for a balance of plant estimator of a power plant controller configured to control a renewable power plant comprising a plurality of power generating units, wherein the balance of plant estimator is configured to provide an internal power loss estimation of the renewable power plant. The embodiments include providing at least one first pair of associated first and second power values in a first power range, providing at least one second pair of associated first and second power values in a second power range, determining a representative of the first pair, and determining a representative of the second pair in accordance with predetermined rules, and calculating a first set of performance parameters using the representatives of the first and second pairs of associated first and second power values.

20 Claims, 3 Drawing Sheets

(56) References Cited

U.S. PATENT DOCUMENTS

| | | | | |
|---|---|---|---|---|
| 2008/0111379 A1* | 5/2008 | Altemark | ............... | F03D 7/042 290/55 |
| 2010/0320763 A1* | 12/2010 | Li | ........................... | H02P 6/18 290/44 |
| 2011/0049883 A1* | 3/2011 | Hatch | .................... | F03D 7/047 290/44 |
| 2017/0234299 A1 | 8/2017 | Kær et al. | | |
| 2020/0271096 A1* | 8/2020 | Ou | ......................... | F03D 7/048 |
| 2022/0284156 A1* | 9/2022 | Zheng | .................... | G06F 30/27 |

FOREIGN PATENT DOCUMENTS

| | | | | | |
|---|---|---|---|---|---|
| EP | 2397689 | A1 | | 12/2011 | |
| EP | 2518665 | A1 | | 10/2012 | |
| EP | 4141253 | A1 | * | 3/2023 | .............. F03D 7/04 |
| WO | 2017114527 | A1 | | 7/2017 | |
| WO | WO-2017220994 | A1 | * | 12/2017 | ............. F03B 15/00 |
| WO | 2020187375 | A1 | | 9/2020 | |

OTHER PUBLICATIONS

PCT International Search Report and Written Opinion for Application PCT/DK2020/050060 dated May 13, 2020.
Chinese Patent Office, Office Action for Chinese Patent Application No. 202080021056.9, dated Dec. 22, 2023.

* cited by examiner

METHOD FOR DETERMINING PERFORMANCE PARAMETERS IN REAL TIME

FIELD OF THE INVENTION

The present invention relates to a method for determining performance parameters for a balance of plant estimator of a power plant controller. In particular, the present invention relates to a method determining performance parameters for the balance of plant estimator from real time measurements and update said performance parameters in accordance with predetermined rules.

BACKGROUND OF THE INVENTION

Modern wind power plant controllers may make use of a so-called Balance of Plant (BoP) estimator in tandem with a regulator in order to improve the performance of the active power loop, cf. for example WO 2017/114527 A1. A BoP estimator is an arrangement capable of calculating internal losses in a wind power plant.

The BoP estimator typically applies three parameters that the user must input as parameters to the active power loop. These parameters must be determined either by electrical predesign studies or by doing measurements of the active power in the field when the wind power plant is commissioned.

Neither of the above solutions are however ideal. Firstly, not all power plants that get commissioned have associated electrical predesign studies, or even if they have, the parameters are not calculated or the internal power losses are not measured. Secondly, when it comes to obtaining the parameters via real field measurements, wind conditions do not always allow the necessary measurements in the available timeframe when the commissioning engineer performs the measurements.

It may be seen as an object of embodiments of the present invention to provide a method for determining BoP performance parameters from real time measurements and update said performance parameters in accordance with predetermined rules.

DESCRIPTION OF THE INVENTION

The above-mentioned object is complied with by providing, in a first aspect, a method for determining performance parameters for a balance of plant estimator of a power plant controller configured to control a renewable power plant comprising a plurality of power generating units, wherein the balance of plant estimator is configured to provide an internal power loss estimation of the renewable power plant, the method comprising the steps of
- providing at least one first pair of associated first and second power values ($P_{prod}$, $P_{meas}$) in a first power range,
- providing at least one second pair of associated first and second power values ($P_{prod}$, $P_{meas}$) in a second power range,
- determining a representative of the first pairs of associated first and second power values ($P_{prod}$, $P_{meas}$), and determining a representative of the second pairs of associated first and second power values ($P_{prod}$, $P_{meas}$) in accordance with predetermined rules, and
- calculating a first set of performance parameters using the representatives of the first and second pairs of associated first and second power values ($P_{prod}$, $P_{meas}$).

Thus, the present invention relates to a method for determining performance parameters for a BoP estimator of a power plant controller. The power plant controller may be configured to control a renewable power plant comprising a plurality of power generating units, such as wind turbine generators (WTGs) and/or other types of power generating units. The BoP estimator, which may form part of an active power loop, may be configured to provide an internal power loss estimation of the renewable power plant, such as an internal power loss of the internal power grid of the power plant.

The BoP estimator may comprise a power loss estimation algorithm for estimating the internal power loss in response to a given parameter. Thus, the power loss estimation algorithm of the BoP may estimate the internal power loss in response to for example a total amount of produced active power from the plurality of power generating units. In particular, the BoP estimator may comprise a second order power loss estimation algorithm where the internal power loss, $P_{loss}$, in estimated in accordance with $$P_{loss} = aP_{prod}^2 + bP_{prod} + c$$

where the three coefficients a, b and c correspond to the performance parameters to be determined by the method of the present invention.

In the present context the term $P_{prod}$ is to be understood as a total amount of produced active power, i.e. available active power, from the plurality of power generating units. The term $P_{meas}$ is, in the present context, to be understood a measured active power at a point of measurement (PoM) which may, or may not, coincide with the point of common coupling (PCC).

The first and second power ranges are to be understood as two selected power ranges which may be a low power and a high power range, respectively. Thus, the first power range may be between 0 and 0.5 pu whereas the second power range may be between 0.5 pu and 1 pu, where 1 pu corresponds to the rated power level of the power plant.

Preferably, a plurality of associated first and second power values ($P_{prod}$, $P_{meas}$) are determined in the first power range, and a plurality of associated first and second power values ($P_{prod}$, $P_{meas}$) are determined in the second power range.

The appliance of the predetermined rules may involve that the plurality of associated first and second power values ($P_{prod}$, $P_{meas}$) determined in the first power range, and the plurality of associated first and second power values ($P_{prod}$, $P_{meas}$) determined in the second power range are in somehow processed. Thus, it may be processed or evaluated if associated first and second power values ($P_{prod}$, $P_{meas}$) deviate less than a predetermined amount from preceding first and second power values ($P_{prod}$, $P_{meas}$) within the first and/or the second power range. If the deviation is less than the predetermined amount a step of calculating respective average values of the associated first and second power values ($P_{prod}$, $P_{meas}$) may be performed, i.e. calculating one average value for each of $P_{prod}$ and $P_{meas}$ in the first power range, and calculating one average value for each of $P_{prod}$ and $P_{meas}$ in the second power range.

The calculated respective average values of the associated first and second power values ($P_{prod}$, $P_{meas}$) form the representatives of the associated first and second power values ($P_{prod}$, $P_{meas}$) in the first and second power ranges, and a first set of performance parameters may be then calculated using these representatives.

The method according to the first aspect may further comprise the steps of providing at least one third pair of associated first and second power values ($P_{prod}$, $P_{meas}$) in a third power range, providing at least one fourth pair of associated first and second power values ($P_{prod}$, $P_{meas}$) in a fourth power range, determining a representative of the third pairs of associated first and second power values ($P_{prod}$, $P_{meas}$), and determining a representative of the fourth pairs of associated first and second power values ($P_{prod}$, $P_{meas}$) in accordance with predetermined rules, calculating a second set of performance parameters using the representatives of the third and fourth pairs of associated first and second power values ($P_{prod}$, $P_{meas}$), and comparing the first and second sets of performance parameters and applying one of them in the balance of plant estimator of the power plant controller if they deviate less than a predetermined amount.

Again, the term $P_{prod}$ is to be understood as a total amount of produced active power, i.e. available active power, from the plurality of power generating units. The term $P_{meas}$ is, in the present context, to be understood a measured active power at a PoM which may, or may not, coincide with the PCC.

The third and fourth power ranges are to be understood as two selected power ranges which may be a low power and a high power range, respectively. Thus, the third power range may be between 0 and 0.5 pu whereas the fourth power range may be between 0.5 pu and 1 pu, where 1 pu corresponds to the rated power level of the power plant. In fact the third power range may be similar to the first power, and the fourth power range may be similar to the second power range.

Preferably, a plurality of associated first and second power values ($P_{prod}$, $P_{meas}$) are determined in the third power range, and a plurality of associated first and second power values ($P_{prod}$, $P_{meas}$) are determined in the fourth power range.

The appliance of the predetermined rules may involve that the plurality of associated first and second power values ($P_{prod}$, $P_{meas}$) determined in the third power range, and the plurality of associated first and second power values ($P_{prod}$, $P_{meas}$) determined in the fourth power range are in somehow processed. Thus, it may be processed or evaluated if associated first and second power values ($P_{prod}$, $P_{meas}$) deviate less than a predetermined amount from preceding first and second power values ($P_{prod}$, $P_{meas}$) within the third and/or the fourth power range. If the deviation is less than the predetermined amount a step of calculating respective average values of the associated first and second power values ($P_{prod}$, $P_{meas}$) may be performed, i.e. calculating one average value for each of $P_{prod}$ and $P_{meas}$ in the third power range, and calculating one average value for each of $P_{prod}$ and $P_{meas}$ in the fourth power range.

The calculated respective average values of the associated first and second power values ($P_{prod}$, $P_{meas}$) form the representatives of the associated first and second power values ($P_{prod}$, $P_{meas}$) in the third and fourth power ranges, and a second set of performance parameters may be then calculated using these representatives.

The first and second sets of performance parameters are then compared and one of the sets may be applied in the BoP estimator of the power plant controller if they deviate less than a predetermined amount.

The plurality of calculated performance parameters to be applied in the BoP estimator may comprise three performance parameters. These three performance parameters may correspond to the three coefficients of a second order power loss estimation algorithm that estimates the internal power loss Ross, as a function of the total amount of produced active power $P_{prod}$, i.e. the available active power, from the plurality of power generating units. It should be noted however that the BoP estimator may be based on other dependencies between $P_{loss}$ and $P_{prod}$ than a second order power loss estimation algorithm. As a consequence the number of performance parameters may differ from three.

The method according to the first aspect may further comprise the steps of providing at least one pair of associated first and second power values ($P_{prod}$, $P_{meas}$) in each of a number of additional power ranges, and determining a representative of the pairs of associated first and second power values ($P_{prod}$, $P_{meas}$) in each of the additional power ranges in accordance with predetermined rules. Preferably, a plurality of associated first and second power values $P_{meas}$) are provided in each of a number of additional power ranges. The representative of the pairs of associated first and second power values ($P_{prod}$, $P_{meas}$) in each of the additional power ranges may be determined as already discussed above.

The step of providing pairs of associated first and second power values ($P_{prod}$, $P_{meas}$) may be performed or triggered at predetermined events, such as during time periods of essentially stable power conditions. The step of providing pairs of associated first and second power values ($P_{prod}$, $P_{meas}$) may also be performed or triggered at predetermined intervals, or it may be initiated manually.

Provided pairs of associated first and second power values ($P_{prod}$, $P_{meas}$) may initially be stored. However, in order to save memory space provided pairs of associated first and second power values ($P_{prod}$, $P_{meas}$) may be deleted when associated performance parameters have been calculated.

In a second aspect the present invention relates to a computer program product for performing the method according to the first aspect when said computer program product is run on a computer processing unit, such as a computer processing unit of a power plant controller.

In a third aspect the present invention relates to a power plant controller configured to control a renewable power plant comprising a plurality of power generating units, the power plant controller comprising a balance of plant estimator configured to provide an internal power loss estimation of the renewable power plant, the power plant controller comprising a sensor arrangement adapted to provide
at least one first pair of associated first and second power values ($P_{prod}$, $P_{meas}$) in a first power range,
at least one second pair of associated first and second power values ($P_{prod}$, $P_{meas}$) in a second power range,
a processor adapted to
determine a representative of the first pairs of associated first and second power values ($P_{prod}$, $P_{meas}$), and determining a representative of the second pairs of associated first and second power values ($P_{prod}$, $P_{meas}$) in accordance with predetermined rules, and
calculate a first set of performance parameters for the balance of plant estimator using the representatives of the first and second pairs of associated first and second power values ($P_{prod}$, $P_{meas}$).

The sensor arrangement of the power plant controller may furthermore be adapted to provide
at least one third pair of associated first and second power values ($P_{prod}$, $P_{meas}$) in a third power range, and
at least one fourth pair of associated first and second power values ($P_{prod}$, $P_{meas}$) in a fourth power range, and wherein the processor is furthermore adapted to determine a representative of the third pairs of associated first and second power values ($P_{prod}$, $P_{meas}$), and determining a representative of the fourth pairs of associated first and second power values ($P_{prod}$, $P_{meas}$) in accordance with predetermined rules, calculate a second set of performance parameters for the balance of plant estimator using the representatives of the third and fourth pairs of associated first and second power values ($P_{prod}$, $P_{meas}$), and compare the first and second sets of performance parameters and applying one of them in the balance of plant estimator of the power plant controller if they deviate less than a predetermined amount.

As already mentioned each first power value ($P_{prod}$) of the first, second, third and fourth pairs of power values may equal a total amount of produced active power from the plurality of power generating units. Moreover, and as mentioned above, each second power value ($P_{meas}$) of the first, second, third and fourth pairs of power values may equal a measured active power at a PoM which may coincide with the PCC.

The plurality of calculated performance parameters to be applied in the BoP estimator may, as already addressed, comprise three performance parameters. However, a different number of performance parameters may also be applicable.

The first and third power ranges may be between 0 and 0.5 pu, and the second and fourth power ranges may be between 0.5 pu and 1 pu, where 1 pu corresponds to the rated power of the power plant.

Provided pairs of associated first and second power values ($P_{prod}$, $P_{meas}$) may initially be stored. However, in order to save memory space provided pairs of associated first and second power values ($P_{prod}$, $P_{meas}$) may be deleted when associated performance parameters have been calculated.

In a fourth aspect the present invention relates to a wind power plant comprising a power plant controller according to the third aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
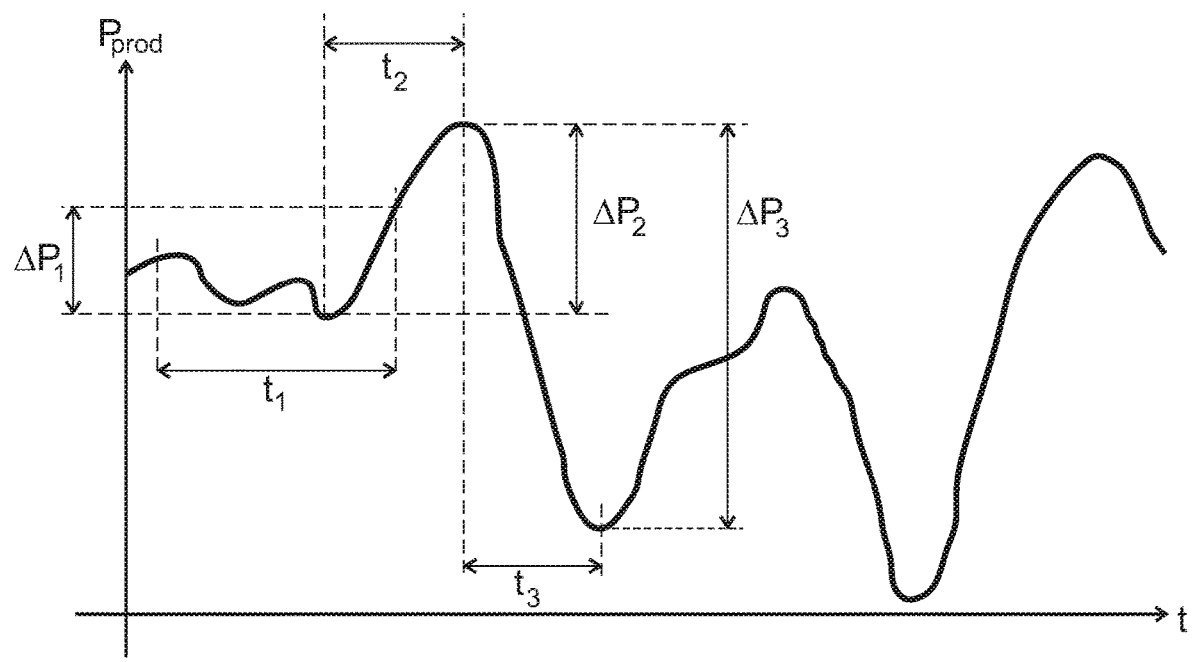
FIG. 1 shows variations in available produced active power, $P_{prod}$.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a method for determining BoP estimator performance parameters from real time measurements and update said performance parameters in accordance with predetermined rules, such as automatically. The updated performance parameters may be uploaded and applied in a power loss estimation algorithm, such as a second order power loss estimation algorithm, of the BoP estimator in accordance with a predetermined set of rules as it will be disclosed in further details below.

The method according to the present invention will in the following be explained with reference to a number of steps—more particularly with reference to seven steps. In terms of implementation the following steps will form part of an active power control scheme for power plants. The steps may not necessarily be carried out in the order outlined below.

In step 1 the active power loop of the power plant controller is initialized with a set of default or predetermined BoP estimator performance parameters. This approach could however lead to limited performance of the control loop. Depending on the type of the active power control scheme non-optimized BoP parameters typically lead to limited performance of the control loop.

In step 2, an allowed variation (peak-to-peak) of the available produced active power, $P_{prod}$, over a specified time period should be decided. The peak-to-peak variation of the available produced active power may depend on the rated active power level of the power plant, and the specified time period may also depend on various parameters.

FIG. 1 depicts how the available produced active power, $P_{prod}$, typically vary over time. FIG. 1 further shows examples of three specified time periods $t_1$, $t_2$ and $t_3$ as well as three associated peak-to-peak values of $P_{prod}$ being denoted $\Delta P_1$, $\Delta P_2$ and $\Delta P_3$.

The allowed variation of the available produced active power, $P_{prod}$, may for example be decided on the basis of known power loss data for various power plant sizes. Generally, the variation of $P_{prod}$ will depend on how much the power loss changes as a function of produced active power according to known power curves.

When the variation of $P_{prod}$ is measured to be within an allowed limit over the the following quantities are measured and stored:

1) the sum of the produced active power from the WTGs, i.e. $P_{prod}$
2) the power measured, $P_{meas}$, at a point of measurement (PoM)

Figure 2:
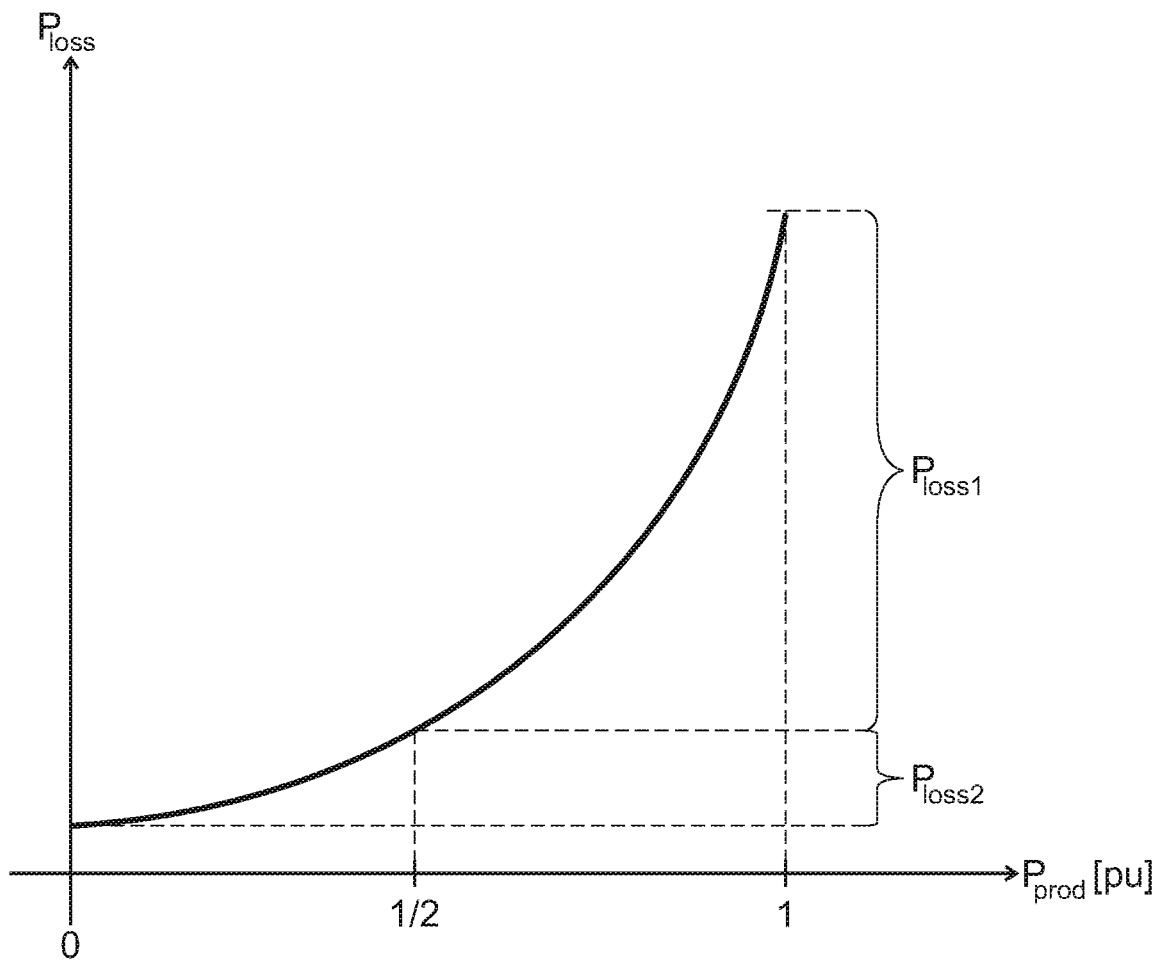
FIG. 2 shows an estimated power loss curve.

FIG. 2 shows a typical power loss curve where the internal power loss, $P_{loss}$, of the power plant is depicted as a function of the produced power, $P_{prod}$, of the power plant. The estimated internal power loss curve shown in FIG. 2 follows a second order dependency of the type $$P_{loss} = aP_{prod}^2 + bP_{prod} + c$$

where the three coefficients a, b and c correspond to the performance parameters to be determined by the method of the present invention.

As depicted in FIG. 2 the power loss changes less ($P_{loss2}$) in the low-power region between $P_{prod}=0$ pu and $P_{prod}=0.5$ pu compared to the power loss changes ($P_{loss1}$) in the high-power region between $P_{prod}=0.5$ pu and $P_{prod}=1$ pu.

In step 3 the number of measurement points and/or power regions necessary to extract the BoP performance parameters is decided. As an example one or more measurement points within the following power regions may be selected 0.1-0.3 pu, 0.3-0.5 pu, 0.5-0.6 pu, 0.6-0.7 pu, 0.7-0.75 pu, 0.75-0.8 pu, 0.8-0.85 pu, 0.85-0.9 pu, 0.9-0.92 pu, 0.92-0.94 pu, 0.94-0.96 pu, 0.96-0.98 pu and 0.98-1 pu.

The selected power region may also be based on available power loss data from various power plant sizes.

In order to minimize the risk of making inaccurate measurements, the measurements of $P_{prod}$ and $P_{meas}$ is repeated until the measurements falls within predefined tolerances, i.e. that at least two consecutive measurements of $P_{prod}$ and $P_{meas}$ fall within the predefined tolerances When the power data, $P_{prod}$ and $P_{meas}$, for all selected power regions are available, i.e. stored, a calculation that extracts the BoP performance parameters from the loss information is performed as step 4 of the method according to the present invention. The calculation that extracts the BoP performance parameters may be based on common mathematical models, such as a mathematical model involving polynomial curve fitting.

In order to make sure that the performance parameters are extracted correctly different power regions and/or different variations of $P_{prod}$ may be defined in a step 5. Based on the different power regions and/or different variations of $P_{prod}$ steps 3 and 4 may be repeated. The set of performance parameters are then compared, and if the sets are within defined tolerances, one of the sets is selected and subsequently prepared for being uploaded to the BoP estimator of the power plant controller.

In step 6 it is decided when to calculate the performance parameters for the BoP estimator. This decision may for example be based on monitoring the estimated internal power losses based on power set-points, and comparing the estimated internal power losses to measured power losses in some sort of "steady state" conditions. The "steady state" condition may be defined in various ways, including looking at the variation of the available produced active power, $P_{prod}$, as discussed in relation to method step 2. If the difference between the estimated and measured internal power losses is larger than a specified limit then the calculation of the performance parameters for the BoP estimator is initiated.

Deciding, in a step 7, when to upload the updated performance parameters to the BoP estimator may be based on a variety of inputs including user instructions or other events, such as active power loop initialization, predetermined time intervals (such as once a year/month/week), as soon as the performance parameters fulfil certain requirements, then an alarm is raised etc. It should be noted that method step 6 may also trigger an alarm.

Figure 3:
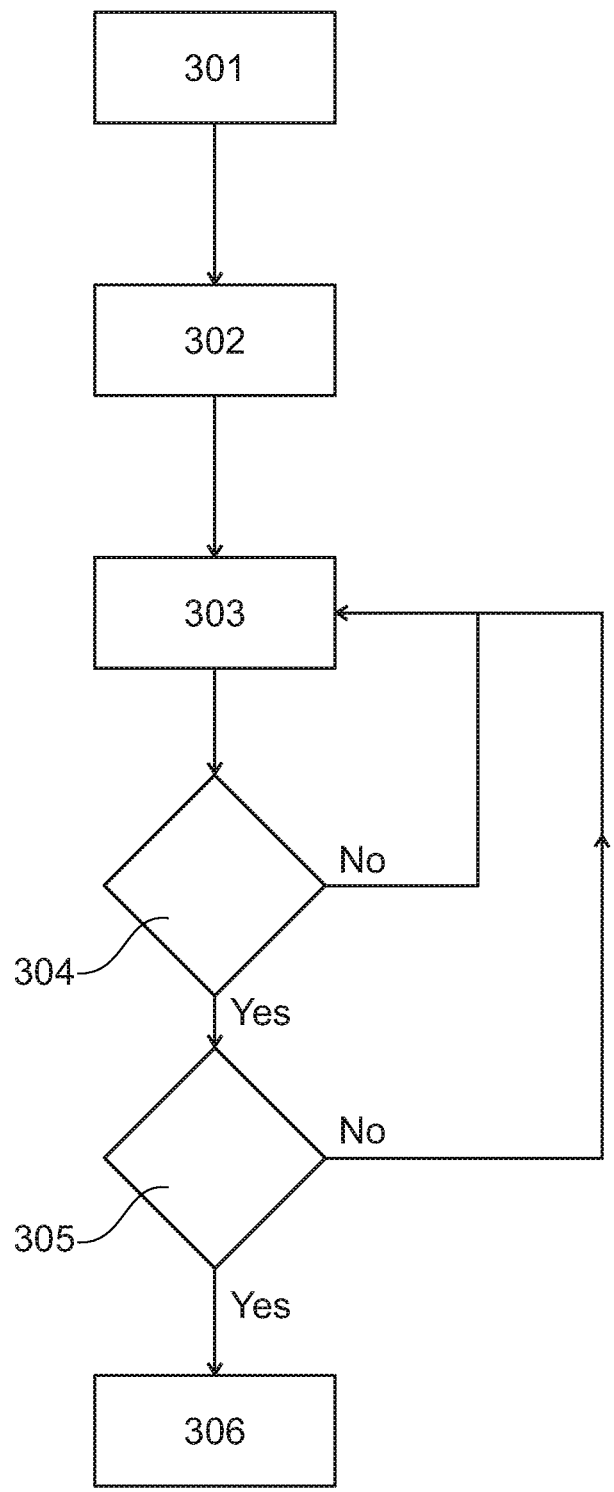
FIG. 3 shows a flow-chart illustrating the method according to the present invention.

The method for determining the performance parameters for the BoP estimator is illustrated in FIG. 3 where the active power loop is initiated as the first step 301. In a second step 302, the allowed variation (peak-to-peak) of the available produced active power, $P_{prod}$, over a specified time period is decided. Moreover, the number of measurement points and/or power regions necessary to extract the BoP performance parameters is also decided in step 302. The available produced active power, $P_{prod}$, is then measured via a plurality of measurements during the specified time period in step 303.

In step 304 it is determined whether variations of $P_{prod}$ are within the allowed limit. If the answer is "No", i.e. $P_{prod}$ varies more than allowed, further measurements $P_{prod}$ are performed. If the answer is "Yes" associated values of $P_{prod}$ and $P_{meas}$ are stored.

In step 305 it is decided whether the measurements of $P_{prod}$ are stable and thus fall within predefined tolerances, i.e. that at least two consecutive measurements of variations of $P_{prod}$ fall within the predefined tolerances. If the answer is "No" further measurements $P_{prod}$ are performed. If the answer is "Yes" a first set of BoP estimator performance parameters are calculated in step 306.

As discussed above the method steps 302 to 306 may be repeated in order to make sure that the BoP estimator performance parameters are extracted correctly. The method steps 302 to 306 leads to a second set of performance parameters which are compared to the first set of performance parameters. If the first and second sets of performance parameters are within predefined tolerances, one of the sets is selected and subsequently prepared for being uploaded to the BoP estimator of the power plant controller.

The invention claimed is:

1. A method for determining performance parameters for a balance of plant estimator of a power plant controller configured to control a renewable power plant comprising a plurality of power generating units, wherein the balance of plant estimator is configured to provide an internal power loss estimation of the renewable power plant, the method comprising:
   providing at least one first pair of associated first and second power values in a first power range;
   providing at least one second pair of associated first and second power values in a second power range;
   determining a first representative of the first pair of associated first and second power values, and determining a second representative of the second pair of associated first and second power values in accordance with predetermined rules;
   calculating, based on the first representative, the second representative, and power loss data, a first set of performance parameters for an estimated power loss algorithm used by the balance of plant estimator;
   generating an estimated power loss by applying the first set of performance parameters to the estimated power loss algorithm; and
   upon determining that a difference between the estimated power loss and a measured power loss exceeds a defined threshold, operating the plurality of power generating units based on the estimated power loss.

2. The method of claim 1, further comprising:
   providing at least one third pair of associated first and second power values in a third power range;
   providing at least one fourth pair of associated first and second power values in a fourth power range;
   determining a third representative of the third pair of associated first and second power values, and determining a fourth representative of the fourth pair of associated first and second power values in accordance with predetermined rules;
   calculating, based on the third representative, the fourth representative, and power loss data, a second set of performance parameters; and
   comparing the first and second sets of performance parameters and applying at least one of the first and second sets of performance parameters to the estimated power loss algorithm in the balance of plant estimator of the power plant controller when a deviation between the first and second sets of performance parameters is less than a predetermined amount.

3. The method of claim 2, wherein each first power value of the first, second, third and fourth pairs of associated first and second power values equals a total amount of produced active power from the plurality of power generating units, and wherein each second power value of the first, second, third and fourth pairs of associated first and second power values equals a measured active power at a point of measurement.

4. The method of claim 1, wherein the first set of performance parameters to be applied in the balance of plant estimator comprise three performance parameters.

5. The method of claim 2, wherein a plurality of the first, second, third and fourth pairs of associated first and second power values are provided.

6. The method of claim 5, wherein applying the predetermined rules comprises selecting the first, second, third and fourth pairs of associated first and second power values when said first, second, third and fourth pairs of associated first and second power values deviate less than a predetermined amount from respective preceding first, second, third and fourth pairs of associated first and second power values.

7. The method of claim 5, wherein applying the predetermined rules comprises calculating respective average values of the plurality of the first, second, third and fourth pairs of associated first and second power values.

8. The method of claim 2, wherein the first and third power ranges are between 0 and 0.5 pu, and wherein the second and fourth power ranges are between 0.5 pu and 1 pu.

9. The method of claim 1, further comprising providing at least one third pair of associated first and second power values in a third power range, and determining a representative of the third pair of associated first and second power values in the third power range in accordance with the predetermined rules.

10. The method of claim 1, wherein providing the first and second pairs of associated first and second power values is performed at predetermined events, including during time periods of essentially stable power conditions.

11. The method of claim 1, wherein the first and second pairs of associated first and second power values are deleted when associated performance parameters have been calculated.

12. The method of claim 1, wherein a computer program product performs the method according to claim 1 when said computer program product is run on a computer processing unit of a power plant controller.

13. A power plant controller configured to control a renewable power plant comprising a plurality of power generating units, the power plant controller comprising a balance of plant estimator configured to provide an internal power loss estimation of the renewable power plant, the power plant controller comprising:
a sensor arrangement adapted to provide:
at least one first pair of associated first and second power values in a first power range;
at least one second pair of associated first and second power values in a second power range;
a processor adapted to:
determine a first representative of the first pair of associated first and second power values, and determining a second representative of the second pair of associated first and second power values in accordance with predetermined rules;
calculate, based on the first representative, the second representative, and power loss data, a first set of performance parameters for an estimated power loss algorithm used by the balance of plant estimator;
generate an estimated power loss by applying the first set of performance parameters to the estimated power loss algorithm; and
upon determining that a difference between the estimated power loss and a measured power loss exceeds a defined threshold, operate the plurality of power generating units based on the estimated power loss.

14. The power plant controller according to claim 13, wherein the sensor arrangement is furthermore adapted to provide:
at least one third pair of associated first and second power values in a third power range; and
at least one fourth pair of associated first and second power values in a fourth power range;
and wherein the processor is furthermore adapted to:
determine a third representative of the third pair of associated first and second power values, and determining a fourth representative of the fourth pair of associated first and second power values in accordance with predetermined rules;
calculate, based on the third representative, the fourth representative, and power loss data, a second set of performance parameters for the balance of plant estimator; and
compare the first and second sets of performance parameters and applying at least one of the first and second sets of performance parameters to the estimated power loss algorithm in the balance of plant estimator of the power plant controller when a deviation between the first and second sets of performance parameters is less than a predetermined amount.

15. The power plant controller according to claim 14, wherein each first power value of the first, second, third and fourth pairs of associated first and second power values equals a total amount of produced active power from the plurality of power generating units, and wherein each second power value of the first, second, third and fourth pairs of associated first and second power values equals a measured active power at a point of measurement.

16. The power plant controller according to claim 13, wherein the first set of performance parameters to be applied in the balance of plant estimator comprise three performance parameters.

17. The power plant controller according to claim 14 wherein the first and third power ranges are between 0 and 0.5 pu, and wherein the second and fourth power ranges are between 0.5 pu and 1 pu.

18. The power plant controller according to claim 13, wherein the first and second pairs of associated first and second power values are deleted when associated performance parameters have been calculated.

19. The power plant controller according to claim 13, wherein the power plant controller is configured to control a wind power plant.

20. A power plant controlling system comprising:
one or more memories collectively storing computer-executable instructions; and
one or more processors configured to collectively execute the computer-executable instructions and cause the power plant controlling system to:
provide at least one first pair of associated first and second power values in a first power range;
provide at least one second pair of associated first and second power values in a second power range;
determine a first representative of the first pair of associated first and second power values, and determining a second representative of the second pair of associated first and second power values in accordance with predetermined rules;
calculate, based on the first representative, the second representative, and power loss data, a first set of performance parameters for an estimated power loss algorithm used by a balance of plant estimator;

generate an estimated power loss by applying the first set of performance parameters to the estimated power loss algorithm; and upon determining that a difference between the estimated power loss and a measured power loss exceeds a defined threshold, operate a plurality of power generating units based on the estimated power loss.

\* \* \* \* \*